United States Patent [19]
Hofmann

[11] 4,050,195
[45] Sept. 27, 1977

[54] APPARATUS FOR COMPENSATING FOR UNBALANCE OF A ROTARY BODY

[75] Inventor: Dionys Hofmann, Darmstadt-Marienhohe, Germany

[73] Assignee: Gebr. Hofmann KG, Maschinenfabrik, Darmstadt, Germany

[21] Appl. No.: 712,359

[22] Filed: Aug. 6, 1976

[30] Foreign Application Priority Data

Aug. 30, 1975 Germany ..................... 7527462[U]

[51] Int. Cl.² ........................................... B25B 41/04
[52] U.S. Cl. .................................. 51/169; 74/573 F
[58] Field of Search .................. 51/169; 74/573, 573 F

[56] References Cited

U.S. PATENT DOCUMENTS

| 3,731,556 | 5/1973 | Decker | 51/169 |
| 3,950,897 | 4/1976 | Birkenstack | 51/169 |
| 3,967,416 | 7/1976 | Birkenstack | 51/169 |

FOREIGN PATENT DOCUMENTS

| 2,101,113 | 7/1972 | Germany | 51/169 |

*Primary Examiner*—Harold D. Whitehead
*Assistant Examiner*—Roscoe V. Parker
*Attorney, Agent, or Firm*—Cushman, Darby & Cushman

[57] ABSTRACT

An apparatus for mounting a grinding wheel of the type having a spindle which is rotated by a motor or the like and on which is mounted a grinding wheel and a machine housing between the wheel end drive. A balancing structure includes a first annular housing mounted on the spindle adjacent the wheel and means mounted on the machine housing for injecting a balancing fluid into the annular housing and a second housing mounted on the spindle adjacent the spindle drive.

3 Claims, 1 Drawing Figure

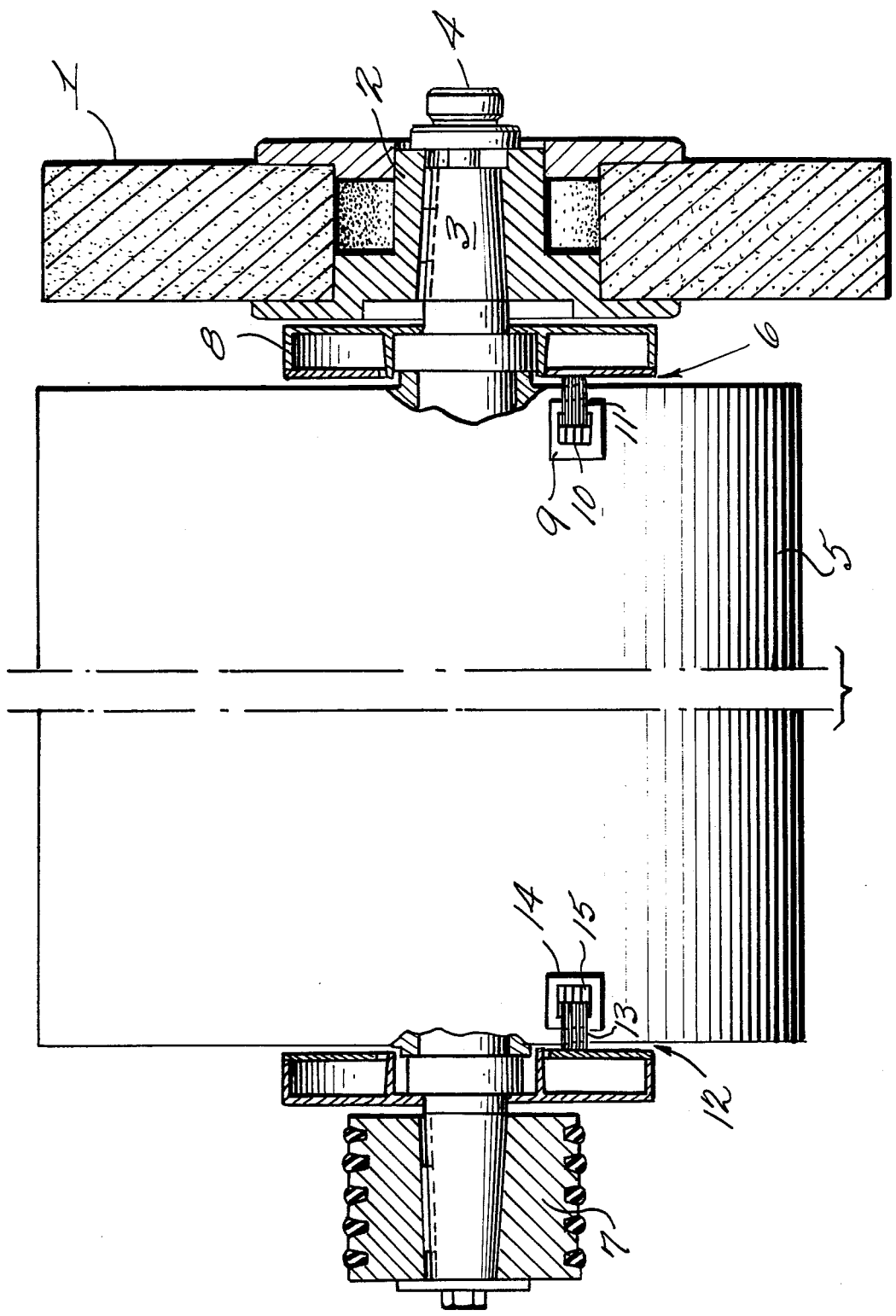

APPARATUS FOR COMPENSATING FOR UNBALANCE OF A ROTARY BODY

This invention relates to apparatus for compensating for unbalance of a rotary body such as a grinding wheel.

In many machines it is necessary to effect precise balancing of a rotary body, for example in the case of grinding wheels of grinding machines; such a balancing operation must be carried out as for example uneven wear will cause the grinding wheel to reach a state of unbalance. As grinding spindles rotate at high rotary speeds, relatively high unbalance forces can occur, even when there is only a slight static unbalance.

A balancing apparatus has been proposed, in which an annular housing is secured from the front to the basic or carrier member of the grinding wheel, concentrically to the axis of the wheel. The housing is arranged to receive a balancing liquid which is injected thereinto, to compensate for unbalance. These devices are described in U.S. Pat. Nos. 3,950,897 and 3,967,416. However in the case of grinding machines which are of universal use, the grinding wheel must frequently be changed, for example to correspond to the material of the workpiece which is to be operated on. In addition, depending on the operating circumstances, wide or narrow grinding discs may be used, so that a change in the grinding wheels is also required. With such an arrangement as set out above, at each change of the grinding wheel the balancing apparatus must be unscrewed from the grinding wheel and re-fixed to the new grinding wheel, and the liquid supply lines and the control unit must be pivoted away or removed before changing the grinding wheel. Alternatively, each grinding wheel can have associated therewith its own balancing apparatus, but this represents a substantial cost.

In addition, in the case of inclined cut grinding machines and flat grinding machines, mounting the balancing apparatus on the front of the grinding wheel gives rise to obstacles in the working space and this can thus cause considerable difficulties.

In a machine having a rotary spindle which in use carries a rotary body and which is supported by a mounting adjacent the rotary body, according to the present invention, there is provided apparatus for compensating for unbalance of the rotary body, comprising an annular housing disposed on the spindle between the rotary body and the spindle mounting and internally divided radially into a plurality of chambers, each chamber communicating with a respective inlet in an annular face of the housing and the inlets being arranged at different radial distances in said face, and means for injecting balancing liquid into the respective inlets and chambers, in dependence on unbalance of the rotary body.

Preferably, the apparatus has two annular housings which are divided radially into a plurality of chambers, for dynamic balancing of for example a grinding machine, the second housing being arranged directly on the grinding machine spindle, such as between the spindle mounting and a drive member for driving the spindle in rotation.

In a preferred embodiment, supply lines for the flow of balancing liquid to the balancing apparatus housing, control valves and a liquid supply container can be incorporated in the grinding machine housing, in order substantially to avoid damage to or fouling of the apparatus.

Apparatus according to the invention will now be described by way of example with reference to the single figure which diagrammatically shows a view in partial cross-section of a balancing apparatus.

The drawing shows a machine such as a grinding machine having a rotary spindle 3 for carrying a rotary body such as a grinding wheel. Thus, as shown, a grinding wheel or disc 1 is secured in known manner on a basic or carrier member 2. The member 2 is in turn arranged on the grinding machine spindle 3, the spindle 3 being of a tapered configuration at one end for fixing the member 2. The grinding wheel 1 and the member 2 are thus centered, and clamped firmly on the spindle 3, by a flange member 4.

The spindle 3 itself is supported in the machine housing 5 in known manner, which is therefore not illustrated in greater detail, by a mounting adjacent to the grinding wheel 1. The other end of the spindle 3 remote from the wheel 1 carries a drive member for rotating the spindle, such as a tapered belt pulley 7 as shown. The remaining stucture of the known machine will not be described in greater detail, for the sake of simplicity.

The machine also has a balancing apparatus 6 for compensating for unbalance of the wheel 1. As shown, the apparatus 6 comprises an annular housing 8 which is secured directly to the spindle 3 between the spindle mounting in the housing 5 and the grinding wheel 1, and thus becomes as one unit with the spindle 3. The housing is divided radially into a plurality of chambers, preferably four chambers, by radial walls. The housing has respective inlets into the chambers, the inlets being disposed at different radial distances from the axis of rotation of the housing, at the side of the housing 8 which is towards the housing 5. A respective chamber thus communicates with each of the inlets. The structure of the balancing device is detailed in U.S. Pat. Nos. 3,950,897 and 3,967,416. The disclosures of which are hereby incorporated by reference.

When there is an unbalance of the wheel 1, balancing liquid is injected by way of respective supply lines 11 into the appropriate inlets and thus the chambers in the housing, valves 10 which can be actuated automatically or manually controlling the flow of balancing liquid from a storage container 9.

The supply lines 11, the valves 10 and the fluid storage container 9 can preferably be arranged in the balancing machine housing 5, as shown.

For the purposes of dynamic balancing of the grinding wheel, a second balancing apparatus 12 which corresponds to the first balancing apparatus 6 can also be provided as shown at the other end of the spindle 3. The second balancing apparatus 12 is fixed directly on the spindle 3, preferably between the housing 5 and the belt pulley 7, in order to ensure that the belts on the pulley 7 can be easily and rapidly exchanged.

In this arrangement also supply lines 13, the control valves 15 controlling the supply lines 13, and the liquid storage container 14 can be arranged within the housing 5.

Instead of the two balancing liquid containers 9 and 14, there may be only one common container.

Arranging the balancing apparatus 6 and 12 directly on the grinding machine spindle 3 provides that the grinding wheel 1 or the taper belts around the pulley 7 can be easily and rapidly exchanged, without the necessity for the balancing apparatus to be dismantled, converted or pivoted out of the way.

In addition, it is possible for the grinding wheel 1, when fixed on the grinding machine spindle, to be subjected to a pre-balancing or coarse balancing operation, by displacement of balancing weights which are often provided in the grinding wheel base member 2, so that fine balancing can subsequently be carried out by means of the balancing apparatus 6 and 12. As such a coarse balancing operation can be carried out by means of the known displaceable balancing weights, the balancing apparatus 6 and 12 can be relatively small in construction, as in that case only a small balancing capacity for the fine balancing operation is required. This in turn means better economy due to savings of cost and space. The balancing operation proper is also shorter as only smaller amounts of balancing liquid have to be injected into the individual chambers to correct any residual unbalance of the grinding wheel.

Many changes and modifications in the above-described embodiment of the invention can of course be carried out without departing from the scope of the invention. Accordingly, the scope is intended to be limited only by the scope of the appended claims.

What is claimed is:

1. In an apparatus for mounting a grinding wheel of the type having a spindle, means for rotating said spindle, means for mounting a grinding wheel on one end of said spindle and balancing means comprising an annular housing having a plurality of radially divided chambers, each chamber communicating with a respective inlet at a different radial distance and means for injecting a balancing liquid into said body as a function of unbalance, the improvement comprising means for mounting said housing on said spindle for rotation therewith with said wheel being mounted between said housing and said end.

2. In an apparatus as in claim 1 the further improvement comprising a second annular housing and means for mounting said second housing on said spindle.

3. In an apparatus as in claim 1 the further improvement wherein said mounting means includes a machine housing incorporating balancing liquid supply lines and control valves for controlling flow of balancing liquid from a liquid source, said lines and valves comprising said injecting means and said machine housing being mounted on said spindle for rotation therewith.

* * * * *